Sept. 22, 1970  G. OLMO  3,529,310
PROCESS TO VENTILATE STUFFINGS OF CELLULAR MATERIAL
AND STUFFING ACTUATED WITH SAID PROCESS
Filed April 4, 1968  2 Sheets-Sheet 1

INVENTOR
GIUSEPPE OLMO
BY OSTROLENK, FABER, GERB & SOFFEN
ATTORNEYS

Sept. 22, 1970  G. OLMO  3,529,310
PROCESS TO VENTILATE STUFFINGS OF CELLULAR MATERIAL
AND STUFFING ACTUATED WITH SAID PROCESS
Filed April 4, 1968  2 Sheets-Sheet 2

INVENTOR
GIUSEPPE OLMO

BY
OSTROLENK, FABER, GERB & SOFFEN
ATTORNEYS

United States Patent Office 3,529,310
Patented Sept. 22, 1970

3,529,310
PROCESS TO VENTILATE STUFFINGS OF CELLULAR MATERIAL AND STUFFING ACTUATED WITH SAID PROCESS
Giuseppe Olmo, Milan, Italy, assignor to S.p.A. Giuseppe Olmo-Superflexite, Italiana-Milan, Italy, a corporation of Italy
Filed Apr. 4, 1968, Ser. No. 719,827
Int. Cl. A47c 23/00
U.S. Cl. 5—347         8 Claims

ABSTRACT OF THE DISCLOSURE

The elastic structure of the stuffing consists, at least in part, of an open cell cellular materiale, the inside of which is provided with ducts that can be connected, at one end thereof, with a compressed air or decompressed air generator and, at the other end thereof, with delivery nozzles, to distribute the air within the stuffing material, so as to ventilate the latter.

---

The invention concerns a process to ventilate and aerate stuffings, in particular cellular material stuffings, said invention also concerns stuffings, such as mattresses and cushions, actuated with said process.

In practice, expanded resins on a latex basis, polyesters and polyethers and the like can be advantageously applied in the manufacture of stuffiings. Said cellular materials, even if of the open cell type, do not consent the realization of a satisfactory aeration, sufficient to meet the practical requirements arising during the use of said stuffings. For instance, in the case of mattresses, they would not have, during the cold season, the necessary non-conducting feature; on the other hand, during the warm season, they would not present the necessary porosity to consent a normal transpiration and could easily overheat.

Consequently, there are several limitations, particularly as regards the requirements connected with the end use of the above mentioned cellular materials, even if they offer a fair degree of softness, high resistance to disinfection temperature and disinfestation and a low cost.

The process of the present invention consents to eliminate said inconvenients and, at the same time, to overcome, in a simple and practical way, the above mentioned limitations. Said process consists in providing ducts in the stuffing material and in creating, in said ducts, an advantageous pneumatic pressure to circulate and to renew the air contained in the cellular structure.

The stuffing designed to actuate the above defined process is characterized by a plurality of ducts, provided in the structure of the stuffing, said ducts connecting with a compressed air generator.

The ducts provided in the stuffing structure can extend in any desired direction to obtain an advantageous diffusion or distribution of the air throughout said structure, in particular, if said structure is of open cell cellular material. Furthermore, said ducts can be closed at one of their ends, or open; in the latter case, the end of the duct can be connected, through advantageous intercepting or adjusting members, with the suction or inlet pipe of the pressure generator, to increase air circulation, as well as to realize a closed circuit ventilation.

The invention will now be explained in the following specification, with reference to the attached drawing illustrating, by way of example, several stuffings actuating the system claimed in the present application, in which:

FIG. 1 is a horizontal cross-section of a mattress actuated according to the present invention.

FIGS. 2, 3, and 4 are similar sections through modified embodiments of the invention, shown on a reduced scale.

Figure 1:
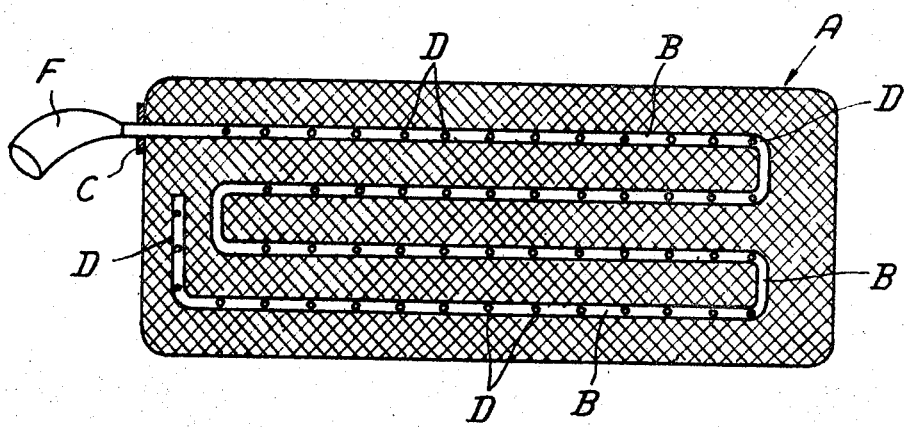

With reference to FIG. 1, the illustrated mattress consists of a block A of cellular material of the type with open micro-cells. According to the present invention, ducts B are provided in the cellular structure of the mattress, said ducts extending substantially along the whole horizontal cross section of the cellular structure. In the present case, the longitudinal ducts B are connected in series to each other, whereby the last of said ducts is closed by said cellular material. The inlet opening of the first of said ducts is provided with a connection C arranged at one end or head of mattress A. The walls of ducts B, besides being permeable, thanks to the cellular structure of mattress A, are provided with small holes D extending, over a certain length, into the cellular material to terminate near the surface of said mattress for the formation of derived ducts. The above described connection C connects with a flexible pipe F leading to the delivery connection of a fan, for instance to a usual hair-dryer. As a consequence, it is possible to establish, in the cellular structure of mattress A, a re-newable air circulation thus maintaining the desired conditions. For instance, during the cold season, the air-insufflated through the cellular material can be pre-heated by means of an advantageous heat source inserted into pipe F. On the other hand, during the warm season, the air, even if it presents an ambient-air temperature, consents to aerate the cellular structure, thus preventing overheating and in particular, to facilitate transpiration.

Figure 2:
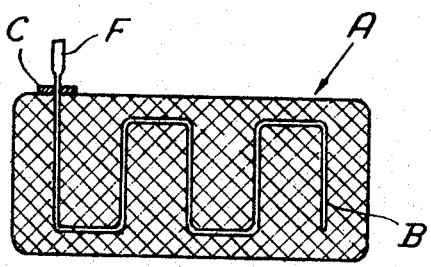
Figure 3:
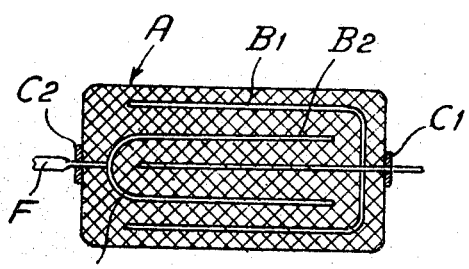
Figure 4:
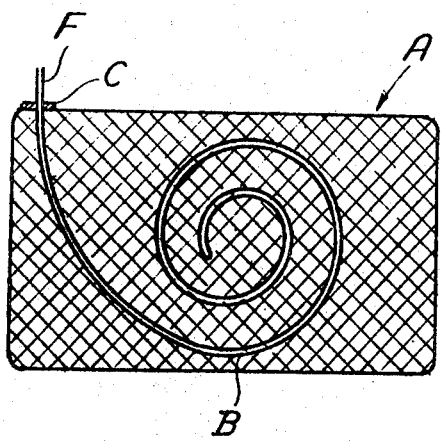

In the modified embodiments shown in FIGS. 2–4, wherein the like or equivalent parts show the same reference numerals, conduits B extend in a different manner. With particular reference to the case shown in FIG. 2, said duct extends transversally through mattress A, whereas in the case shown in FIG. 3, stuffing A foresees two duct units, respectively $B_1$ and $B_2$, each of which fitted with a feeding connection $C_1$ and $C_2$ respectively: in the last case, shown in FIG. 4, duct B extends in the form of a spiral.

Figure 5:
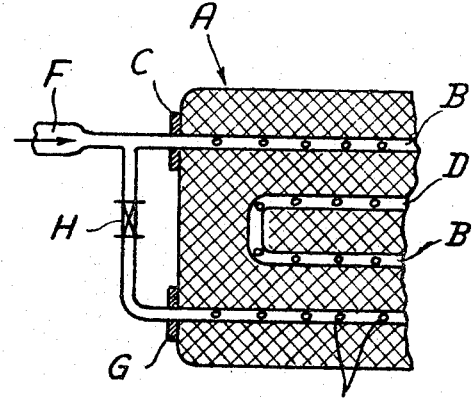
FIG. 5 is a cross-section through the end of a stuffing.

FIG. 5 shows a stuffing A in which the duct or the ducts B are provided both with and inlet and an outlet opening C, to consent an advantage air circulation which can be varied by adjusting the quantity of air circulating through the cellular material. For this purpose a throttling member H is inserted into the pipe. As shown in FIG. 5, said pipe can connect to the inlet duct F, or otherwise to the suction duct of the fan which forwards air into duct F. This arrangement proves particularly advantageous in such cases in which hot air is conveyed into the cellular structure, whereby said air can be recovered and reintroduced into the cycle.

The realization of ducts B in the cellular structure can be obtained, for instance, by providing the faces of two blocks with specularly symmetrical grooves, whereafter said blocks are joined together, to form the stuffing. Said stuffing can be provided, at its back side, with a less porous structure than that of the opposite side, in such a way that aeration takes place prevailingly through said surface which is more permeable.

It is not excluded that in such cases in which hot air sources are provided, said sources can be arranged in the stuffing itself, i.e. next to inlet connection C.

Figure 6:
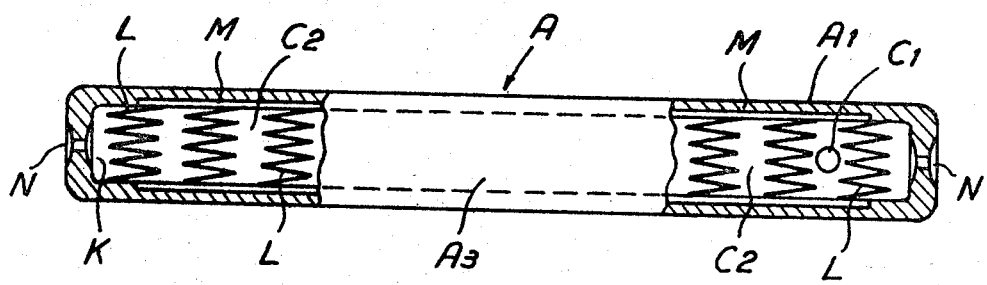
FIGS. 6 and 7 show, in lateral elevation and in plane view, a springed stuffing for seats.
Figure 7:
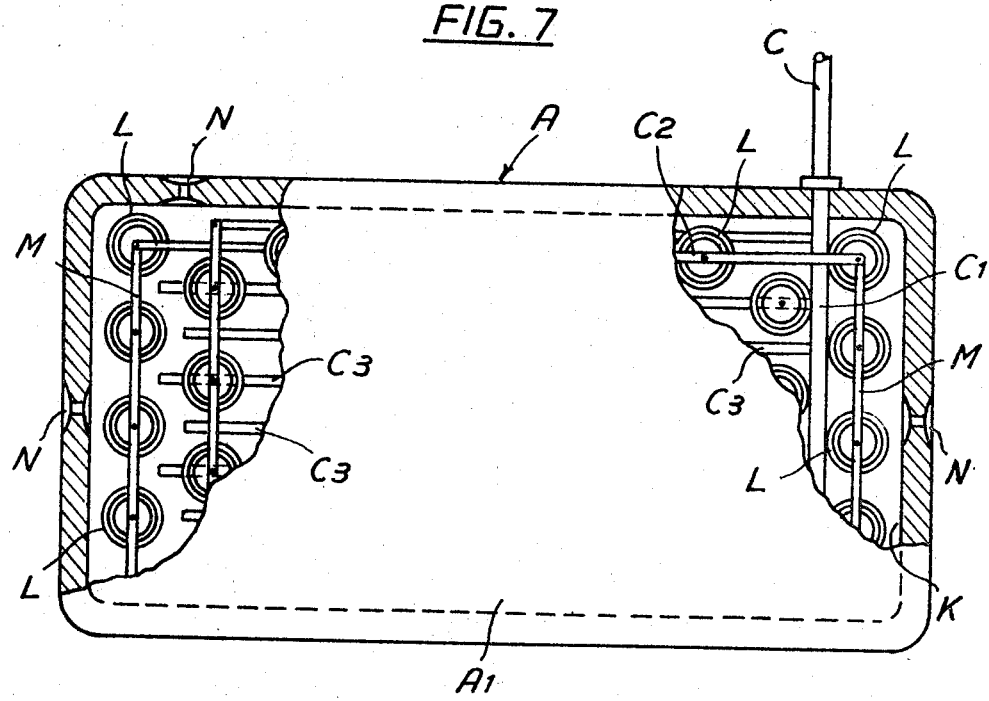

FIGS. 6 and 7 show the application of the invention to stuffings of the usual kind, consisting of a blended structure, i.e. of springed metal elements incorporated into a covering structure consisting, at least in part of cellular material.

Structure A includes a springed insertion, formed by spiral springs L, the ends of which are retained by two frames M, sunk, at least partly, into the thickness of walls $A_1$ and $A_2$, to form, together with peripherical walls $A_3$, a blended structure provided with internal, hollow parts K. As the material forming walls $A_1$ and $A_2$ presents a cellular structure c./c. basically consisting of fibres, the hollow part K connects to the atmosphere through the porous structure of said walls and thanks to the different porosity and permeability of said walls, it is possible to dispose, each time, according to the different climatic conditions, of a more or less aerated wearing surfaces.

The ventilating air is admitted into cavity K by means of one or serval connections C provided in the lateral walls $A_3$ leading to the compressed air generator, to create, in chamber K, either a pressure or a vacuum with respect to the ambient pressure.

To obtain, in the hollow part (cavity) K, a uniform pressure, connection C connects to a collection $C_1$ of yielding material, housed in said cavity. Two distributor ducts $C_2$ provided wtih holes or openings $C_3$, are extending from collector C, thus preventing the creation of higher and lower pressure areas, which would prevent a constant transpiration through all of the different sections of walls $A_1$ or $A_2$ of the stuffing.

Duct C can be provided with gauged diaphragms or throttling members, to regulate the quantity of air introduced into cavity K. Furthermore, to prevent the formation of excessive pressures in chamber K when the stuffing is compressed, the side walls $A_3$ are provided with gauged openings N which can be eventually provided with valves.

As previously mentioned, the above described stuffing can be applied in many cases, that is in the manufacture of mattresses or elements (back or bottom) of armchairs and the like. When the stuffing is used in seats or motor cars, the ventilation of the structure will have to take account of the specific requirements of vehicles.

In such cases the vehicle can be equipped with an external air inlet, to realize the ventilation of the stuffing, as well as of the inside of the vehicle. Instead of using an air inlet to ventilate the stuffing, it is possible to make use of a fan, which is fed by the battery installed on board of the vehicle.

To heat the stuffing installed on board of motor cars, it is possible to make use of air-pre-heated by the motor and then conveyed into said stuffing, through ducts advantageously provided with commutable intercepting members, designed to prevent the pre-heating of the air, when undesirable. Still in connection with the heating of the stuffing, the latter can incorporate a thermoelectric, advantageously protected resistance, for instance, housed in chamber K. With particular reference to such cases in which mattresses and cushions are realized with walls showing a different porosity, such walls, as are not made use of, can be rendered air-tight, by covering the same with an appropriate lining.

The details of the embodiment of the stuffing, as well as the arrangement of conducts $C_2$ can be varied, though remaining within the limits of the present invention.

What is claimed is:

1. In a stuffing consisting at least in part of cellular material of the open-cell type for use in an environment where known stuffings are subject to over heating where ambient temperatures are warm and subject to presenting an uncomfortably cold surface where ambient temperatures are cool, the combination comprising:

at least one duct section within said stuffing for passing heated air therethrough during relatively cool ambient temperatures and for passing cold air therethrough as ambient temperatures rise;

a plurality of holes within said section for distributing said heated and said cold air throughout said stuffing;

and an air inlet adapted to receive temperature controlled air for the passage through and regulation of said temperature within said stuffing.

2. The combination of claim 1 wherein said duct section extends almost to the outer covering of said stuffing to further aid in distributing said heated and said cold air therethrough.

3. The combination of claim 1 wherein there is also included an air outlet adapted to receive air distributed through said stuffing by said duct section, plurality of holes and inlet valve for discharging said distributed air to the outside atmosphere to further facilitate the regulation of temperature within said stuffing.

4. In combination with the stuffing of claim 1, pneumatic pressure means coupled to said air inlet for circulating heated and cold air through said stuffing.

5. The combination of claim 3 wherein there is also included within said stuffing, means for regulating air pressures therein, said means including a housing of yieldable material, a first duct for coupling said housing to a source of pressure regulated air, and a plurality of duct sections coupled to said housing for distributing air therein throughout said stuffing to stabilize high and low pressure areas within said material.

6. In combination with the stuffing of claim 3, pneumatic pressure means coupled to said air inlet for circulating heated and cold air through said stuffing and throttling means coupled to said air outlet for recovering distributed air and for reintroducing said air to said stuffing through said air inlet.

7. The combination comprising:

a stuffing for chairs, mattresses and the like consisting at least in part of cellular material of the open-cell type and having at least one duct section for receiving heated air therethrough during relatively cool ambient temperatures and for receiving cold air therethrough as ambient temperatures rise;

a source of heated air;

and a switch-operated intercepting member connecting said duct section to said heat source in one position to introduce pressurized, heated air into said section and connecting said duct section to the ambient atmosphere in a second switch position for sucking cooler ambient air into said section to provide heating of said stuffing in the first instance and ventilation theerof in the second instance through said cellular material and said duct section.

8. The combination of claim 7 in which said heat source includes a heat exchanger inserted into said duct section with the outer end thereof connecting through said intercepting member to the suction and inlet tubes of a fan in a way as to circulate heated air through said stuffing.

References Cited

UNITED STATES PATENTS

| 2,059,226 | 11/1936 | Gates | 5—347 |
| 2,158,801 | 5/1939 | Petterson | 5—347 XR |
| 2,826,244 | 3/1958 | Hurley | 5—347 XR |
| 3,377,103 | 4/1968 | Borton et al. | 5—347 XR |

BOBBY R. GAY, Primary Examiner

A. M. CALVERT, Assistant Examiner

U.S. Cl. X.R.

297—453